Jan. 12, 1943.  R. WOODALL  2,308,139
MAKE-UP CABINET
Filed Sept. 21, 1940    3 Sheets-Sheet 2
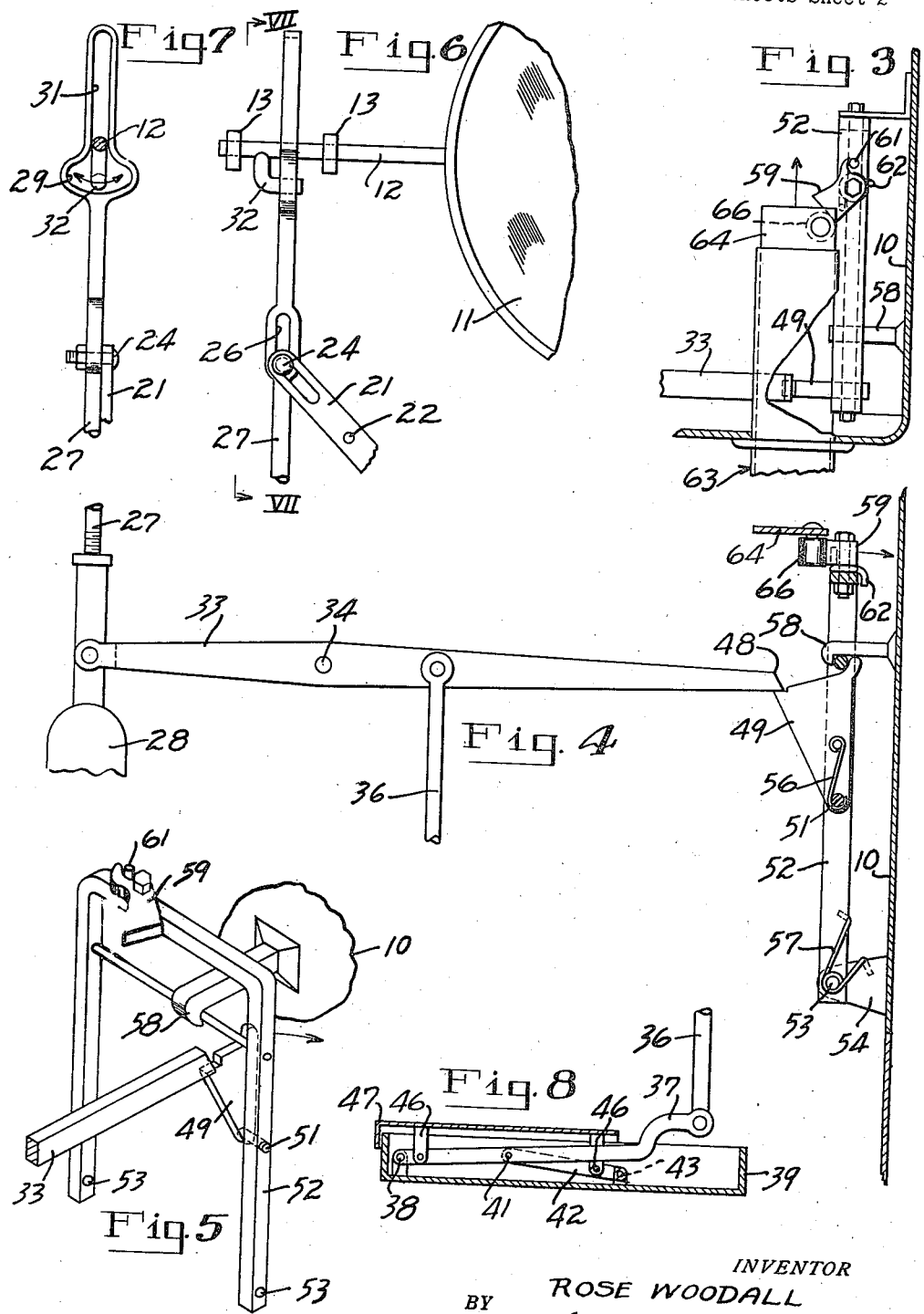
INVENTOR
ROSE WOODALL
BY Johnston & Jennings
ATTORNEYS

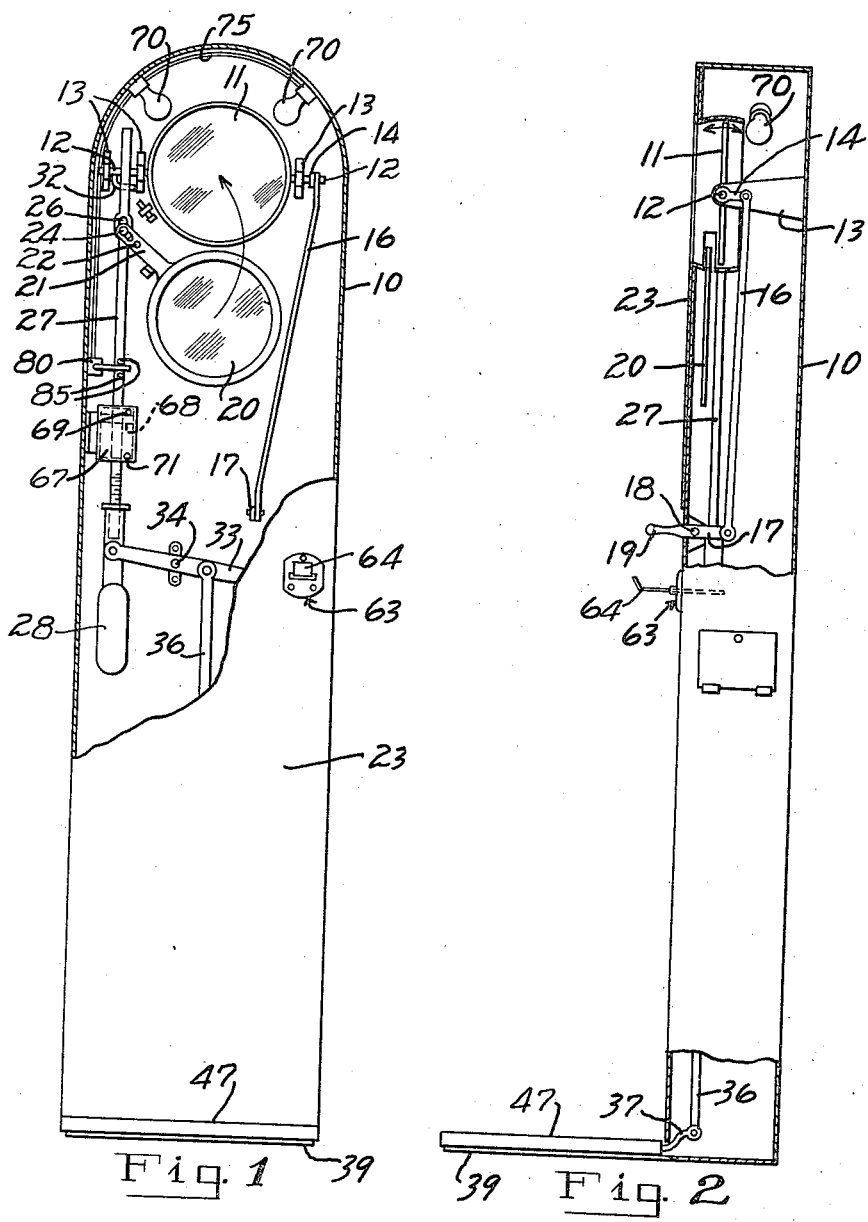

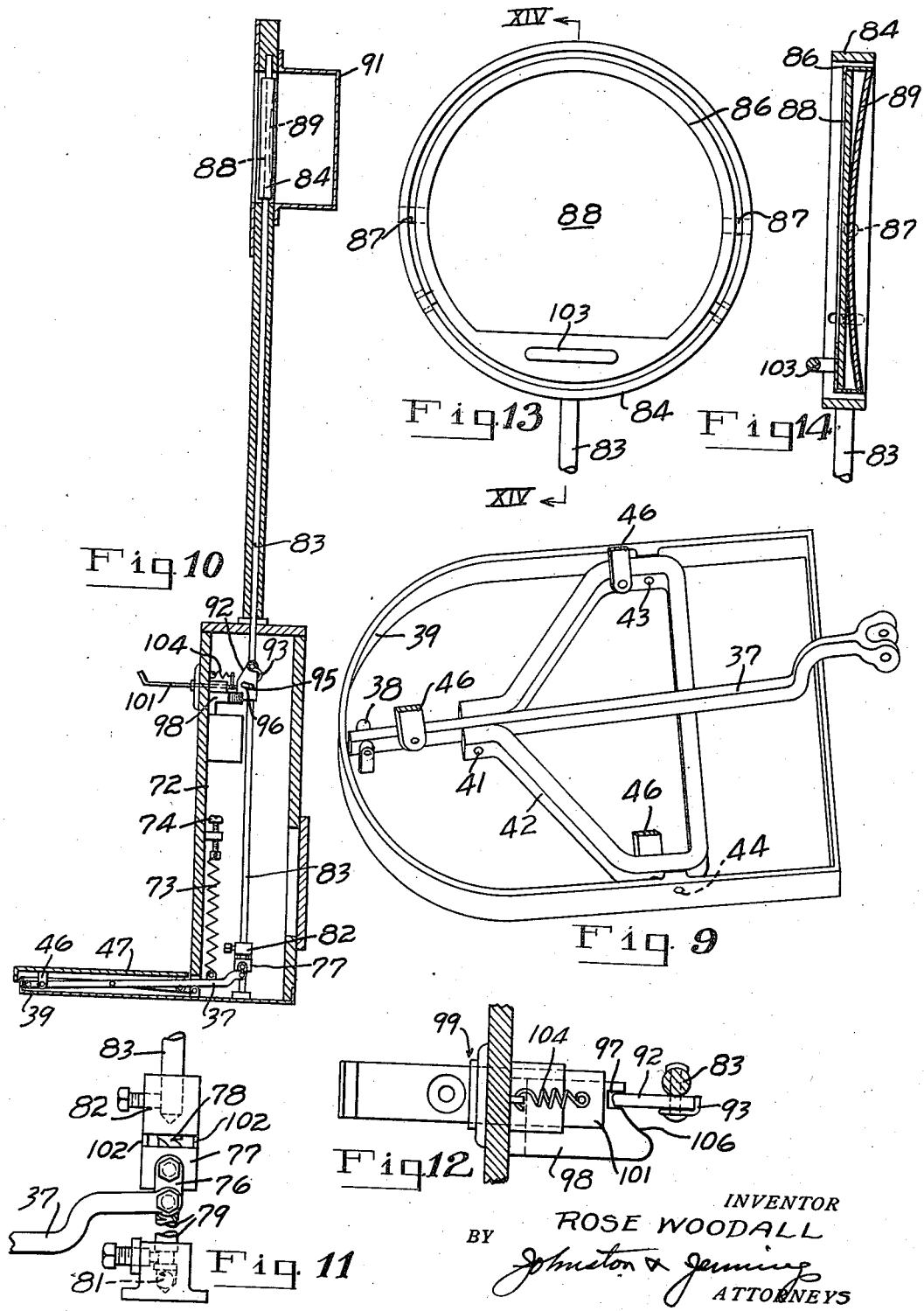

Patented Jan. 12, 1943

2,308,139

UNITED STATES PATENT OFFICE 2,308,139

MAKE-UP CABINET

Rose Woodall, Birmingham, Ala.

Application September 21, 1940, Serial No. 357,703

4 Claims. (Cl. 88—74)

My invention relates to a make up cabinet, and has for its object to provide, in such a cabinet, mirrors having different reflecting characteristics, and means to cause said mirrors to change positions in the cabinet whereby they may be selectively used.

A further object of my invention is to provide a make up cabinet embodying a normally hidden magnifying mirror, and coin controlled mechanism for bringing the magnifying mirror into view.

A more specific object of my invention is to provide a cabinet having a plane surfaced mirror and a magnifying mirror normally hidden by the plane surfaced mirror, and coin controlled mechanism operable responsive to a predetermined minimum weight to bring the magnifying mirror into view.

Briefly, my invention, in its preferred embodiment, comprises a magnifying mirror which is normally screened or hidden by a shutter bearing a plane surfaced mirror so mounted that it may be moved to bring the magnifying mirror into view. A coin controlled mechanism operated by the weight of a user is employed to move the shutter away from the magnifying mirror. Means are provided to tilt the mirror so as to accommodate it to persons of different height. When the user steps off of the platform provided in front of the cabinet, the shutter moves back to its normal position and the magnifying mirror is automatically restored to a position with its surface substantially in a vertical plane whereby it is out of the way of the shutter.

These and other features of my invention are illustrated in the accompanying drawings forming a part of this application, in which Fig. 1 is a front elevation, partly in section, showing a cabinet embodying one form of my invention;

Fig. 2 is a side view of the same;

Fig. 3 is a detail plan view of a part of the coin controlled releasing mechanism;

Fig. 4 is a front view of the same;

Fig. 5 is a perspective view of the releasing mechanism;

Fig. 6 is a detail front view showing the means for restoring the magnifying mirror to a substantially vertical plane when the cabinet is not in use;

Fig. 7 is a view looking in the direction of the arrows VII—VII in Fig. 6;

Fig. 8 is a sectional view of the platform and its operating parts;

Fig. 9 is a perspective view of the lever mechanism in the platform;

Fig. 10 is a sectional elevation showing a modified form of my invention;

Fig. 11 is a detail view of the means employed to actuate the mirrors of Fig. 10;

Fig. 12 is a detail view of the coin controlled release mechanism of Fig. 10; and Figs. 13 and 14 are views showing the mounting of the mirrors in the embodiment shown in Fig. 10.

Referring now to the drawings for a better understanding of my invention, I show, in Figs. 1 and 2, a cabinet 10 in which is mounted a magnifying mirror 11 by means of horizontal shafts 12 journalled in brackets 13. At one end of the mirror the shaft 12 is provided with a crank arm 14 connected to a link 16 which is connected at its lower end to a lever 17 pivoted at 18 and extending out of the cabinet 10 at 19 to provide a manual means for tilting the mirror 11 to accommodate it to persons of different heights.

The magnifying mirror 11 is normally screened by a shutter 20 bearing a plane surfaced mirror having a handle 21 pivotally mounted at 22 at one side of the mirror 11. In the drawings, Fig. 1, the shutter 20 is shown in its downward position, in which position it is away from in front of the magnifying mirror and out of view of the user behind the front wall 23 of the cabinet 10. The outer end of the handle 21 has a pin 24 passing through a slotted opening 26 in a vertically extending rod 27. The lower end of the rod 27 has connected thereto a weight 28 which tends to pull the rod downward and to swing the shutter 20 about its pivot 22 to reveal the magnifying mirror 11. The upper end of the rod 27, as shown in Fig. 7, is provided with a widened opening 29 at the bottom of an elongated slot 31 through which extends the shaft 12 of the magnifying mirror 11. A short crank arm 32 is connected to the shaft 12 and extends downwardly into the widened opening 29 when the magnifying mirror 11 is exposed by movement of the shutter 20, to the position shown in Fig. 1. This permits the tilting of the mirror 11 through the instrumentality of the handle 19 and linkage 16, as already described. When the rod 27 is pulled downwardly to pull the shutter 20 back up to its shielding position, the slot 26 permits the rod 27 to move downwardly its length before engaging the pin 24. If the mirror 11 has been tilted, the lower end of the crank arm 32 is engaged, during the movement just described, by the sides of the slots 31 and it is automatically brought back to a position in which its surface lies in substantially a vertical plane before the shutter 20 starts upwardly to shield it. This prevents any interference to the movement of the mirrors.

The lower end of the rod 27 has pivoted thereto a transverse lever 33 which is pivoted at 34 and has connected intermediate its ends a downwardly extending link 36. The lower end of the link 36 is connected to a lever arm 37 adapted to be actuated by the weight of a user. See Figs. 8 and 9. The lever arm 37 is pivotally mounted at 38 in a platform frame 39. Pivotally connected to the lever arm 37 at 41, intermediate its ends, is a yoke 42, which in turn is pivotally connected to the sides of the frame 39 at 43 and 44. Fixedly secured to the arms 37 and to the yoke 42 are brackets 46, on which rests a platform 47, so that the weight of the user at any point on the platform tends to pull the lever arm 37 downwardly together with the link 36 and the lever 33. The connection for the link 36 being beyond the pivot 34 with respect to the rod 27, a downward pull on the rod 36 tends to push the rod 27 upwardly whereby to swing the shutter 20 downwardly to bring the magnifying mirror 11 into view.

The opposite end of the lever 33 from the rod 27 terminates in a detent 48 which, when the mirror 20 is in its upper or shielding position, rests against a catch 49, as shown in Fig. 4, which is pivotally connected at 51 to a frame 52 which in turn is pivotally connected at 53 to a bracket 54 secured to the rear of the cabinet 10. A spring 56 biases the catch 49 to the position shown in Fig. 4 of the drawings, while a spring 57 likewise biases the frame 52 to the position shown. The frame 52 has its movement away from the wall of the cabinet 10 limited by means of a hook 58, which permits the frame to swing toward the back wall of the cabinet but prevents its moving farther inwardly of the cabinet. Mounted on the upper end of the frame 52 is a dog 59, which is normally held at rest against a pin 61 by means of a spring 62, and which extends inwardly of the cabinet, as shown in Figs. 3 and 4.

At 63 is shown a well known form of coin receiving mechanism, which needs no detail description, and which embodies a slide 64 extending inwardly of the cabinet 10. Carried by the slide 64 is a roller 66, which is adapted, when a coin is inserted in the coin controlled mechanism and the slide pushed inwardly, to engage the dog 59, as shown in Fig. 3, and cause the frame 52 to swing toward the wall of the cabinet so that the catch 49 releases the detent 48. The weight of the user on the platform 47 then pulls the lever arm 37 and link 36 downwardly to push the rod 27 upwardly and swing the shutter 20 about its pivot 22 to the position shown in Fig. 1. Movements of the rod 27 and the mirror 20 are cushioned by means of a dash pot cylinder 67 having a piston 68 therein which is mounted on the rod 27. Vents 69 and 71 at opposite ends of the cylinder 67 permit a cushioned movement of the rod 27.

When a person steps off the platform 47, the weight 28 pulls the associated end of the lever 33 downwardly and swings the opposite end about the pivot 34, whereupon the detent 48 pushes the catch 49 inwardly and swings past it to catch, as shown in Fig. 4. The retracting of the coin slide 64 causes the roller 66 to engage the dog 59 on the opposite side, whereupon it swings about its pivot and does not actuate the frame 52. The provision of the springs 57 and 56 insures action of the catch 49 to engage with the detent 48. It will be apparent that the mass of the weight 28 determines the minimum weight at which the apparatus will operate. This prevents defrauding the apparatus by means of one person stepping partly on the platform 47 before another steps wholly off, the platform being of a size such that it will only accommodate one person at a time. The weight 27 is preferably made of a mass such that it requires about 75 pounds to operate the apparatus.

At 70 are shown lights for illuminating the face of a user. Suitable wiring 75 leads from the lights to a switch 80 which is actuated by means of pins 85 on the rod 27 to light the lights when the mirror 20 is in the position shown in Fig. 1 and extinguish them when the magnifying mirror 11 is shielded.

Referring now to Figs. 10 to 14 inclusive, I show a modified form of my invention. In accordance with this modification, I employ a platform 47 actuating a lever arm 37, as already described. The platform 47 is associated with a cabinet 72, and the spring 73, adjustable by means of a set screw 74. counterbalances the platform 47 and determines the minimum weight at which the apparatus operates. The lever arm 37 has connected to its lower end, by means of links 76, a nut 77 provided with steep pitch threads coacting with similar threads 78 formed on an oscillatory shaft 79 journalled in a ball step bearing 81 on its lower end, as shown in Fig. 11.

Connected to the upper end of the oscillatory shaft 79, by means of a sleeve and set screw connection 82, is a vertically extending rod 83, which extends to the upper end of the cabinet. The upper end of the rod 83 is connected to a frame 84, in which is mounted a second frame 86 on horizontal axes 87. The frame 86 has mounted therein a plane surfaced mirror 88 and a magnifying mirror 89, the plane surfaced mirror 88 being normally in view and hiding the magnifying mirror 89, which is incased by an enclosure 91.

Pivotally mounted on the rod 83 at a height to be convenient to the user, is a dog 92, which is normally biased outwardly from the rod by means of a spring 93, and has its movements limited thereon by means of a pin 95 engaging in a slot 96. The dog 92 is normally engaged in a notch 97 in a stationary detent 98, secured to the wall of the cabinet 72. Coin controlled mechanism 99 has its slide 101 adapted to engage the dog 92 to push it out of the notch 97 when a coin is inserted and the slide 101 pushed inwardly, as shown in Fig. 12. When this is done, the weight of a user on the platform 37 pushes the nut 77 downwardly on the shaft 79 to rotate it in a counterclockwise direction, as viewed in Fig. 12, to expose the magnifying mirror 89. A stop 102 on the sleeve connection 82 causes the mirror to stop in a position with its surface in front of the user. It can be tilted to accommodate users of different height by means of a handle 103 secured to the bottom thereof. When the user steps off the platform 47, the spring 73 pulls the lever 37 upwardly, causing the rod 83 to oscillate, as already described, bringing the plane surfaced mirror 82 back into view. A spring 104 retracts the slide 101, permitting the dog 92 to engage the curved surface 106 of the detent 98, and be guided into the slot 97 to make the apparatus ready for the next user.

From the foregoing it will be apparent that I have devised an improved make up cabinet adapted for use in public rest rooms and other appropriate places accessible to the public, whereby ladies may conveniently, at a small expense, have the benefit of a magnifying mirror in studying their complexions and determining the type make up best suited.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are specifically set forth in the appended claims.

What I claim is:

1. In apparatus of the character described, a cabinet, a magnifying mirror mounted to rest in a substantially vertical plane and to tilt a limited distance on a horizontal axis in the cabinet, a shutter pivotally mounted to swing in a plane substantially parallel to the surface of the magnifying mirror and normally shielding the latter, a platform associated with the cabinet and adapted to support a user of the mirror, lever mechanism connected to the platform, link means from the lever mechanism to the shutter to swing it responsive to the weight of the user when on the platform to uncover the magnifying mirror, manually operable means to tilt the magnifying mirror when it is uncovered, a detent for holding the link against movement, coin controlled mechanism for releasing the detent, counterweight means to restore the mechanism to its normal position when no user is on the platform, and a connection between the link means nad the magnifying mirror to restore it to a substantially vertical plane when no weight is on the platform.

2. Apparatus as defined in claim 1, in which the means for restoring the magnifying mirror to a substantially vertical plane comprises a crank arm on the mirror, a slotted end on the link, said slot being widened to permit the crank arm to oscillate a limited distance when the magnifying mirror is exposed, and narrow enough to engage the crank arm and restore the mirror to a vertical plane when the shutter is moved to shield the magnifying mirror.

3. In apparatus of the character described, a cabinet, a magnifying mirror mounted to rest in a substantially vertical plane and to tilt a limited distance on a horizontal axis in the cabinet, a shutter pivotally mounted to swing in a plane substantially parallel to the surface of the magnifying mirror and normally shielding the latter, a platform associated with the cabinet and adapted to support a user of the mirror, lever mechanism connected to the platform, link means from the lever mechanism to the shutter to swing it responsive to a predetermined minimum weight on the platform to uncover the magnifying mirror when the user is on the platform, manually operable means to tilt the magnifying mirror when it is uncovered, a detent for holding the link against movement, coin controlled mechanism for releasing the detent, counterweight means to restore the mechanism to its normal position when no weight is on the platform, and a connection between the link means and the magnifying mirror to restore it to a substantially vertical plane when no weight is on the platform.

4. Apparatus as defined in claim 3, in combination with a light to illuminate the face of a user, and a switch for the light operated by the link means when swinging the shutter to uncover the magnifying mirror.

ROSE WOODALL.